United States Patent

Charransol et al.

[11] 4,142,068
[45] Feb. 27, 1979

[54] TIME-DIVISION AND SPATIAL CONNECTION NETWORK

[75] Inventors: Pierre Charransol; Jacques Hauri; Claude Athénes, all of Paris, France

[73] Assignee: Thomson-CSF, Paris, France

[21] Appl. No.: 807,687

[22] Filed: Jun. 17, 1977

[30] Foreign Application Priority Data

Jun. 22, 1976 [FR] France .................................. 76 18928

[51] Int. Cl.$^2$ ............................................. H04J 3/00
[52] U.S. Cl. ................................................. 179/15 AT
[58] Field of Search .................................... 179/15 AT

[56] References Cited

U.S. PATENT DOCUMENTS

| | | | |
|---|---|---|---|
| 3,851,105 | 11/1974 | Regnier et al. ................. | 179/15 AT |
| 3,920,914 | 11/1975 | Regnier et al. ................. | 179/15 AT |
| 3,974,340 | 8/1976 | Ghisler ............................ | 179/15 AT |
| 3,983,330 | 9/1976 | Tongi .............................. | 179/15 AT |
| 4,001,781 | 1/1977 | Charransol et al. ........... | 179/15 AT X |

*Primary Examiner*—Thomas W. Brown
*Attorney, Agent, or Firm*—Cushman, Darby & Cushman

[57] ABSTRACT

The invention relates to the connection networks used for switching digital signals, more especially telephonic PCM signals. It consists in organizing the spatial stage of a network of the TST type operating in series mode so as to divide into two the number of switching planes of that network. Each plane is with blocking although the assembly is without blocking. Moreover the number of time paths that enables the spatial stage to be traversed is doubled.

2 Claims, 3 Drawing Figures

TIME-DIVISION AND SPATIAL CONNECTION NETWORK

This invention relates to time-division and spatial connection networks which, in telephone exchanges using the technique of Pulse Code Modulation (PCM), enable a calling subscriber to be connected to a called subscriber.

It will be recalled that the PCM technique consists in sampling voice signals at a frequency of 8 kHz and in encoding the samples thus obtained in an 8-bit form. The samples thus encoded are then collected in frames of 32 time slots (IT) which correspond to 32-channel PCM junctions. These figures are offered purely by way of example although they are generally used on account of the national and international standards which are imposed for obvious reasons of compatibility. The same will apply throughout the remainder of this text.

It is known that more or less complex assemblages of circuits known as time switches and spatial switches can be used for constructing the connection networks of telephone exchanges.

It is known for example to construct connection networks of the TST type in which one spatial stage (S) is comprised between two time stages (T), the assembly enabling the required connections to be established.

If a network of the type in question is to be without blocking, the number of output meshes must be equal to twice (with the exception of one strictly speaking) the number of access meshes both in the spatial stages and also in the time stages (where the meshes are represented by the time slots).

This requirement means that it is necessary, at a constant rate, to double the hardware of the time stages and, hence, to quadruple the hardware of the spatial stages. This is extremely onerous.

In accordance with the present invention, there is provided a time-division and spatial connection network for switching signals digitalized on n bits from a plurality of input junctions to a plurality of output junctions, said network comprising:

an input time switching stage connected to said input junctions;

a spatial switching stage connected to said input time switching stage for serially switching said signals; said spatial switching stage comprising $n + k$ ($1 \leq k \leq n$) separate independent planes; and an output time switching stage connected to said spatial switching plane and to said output junctions.

For a better understanding of the invention, and to show how the same may be carried into effect, reference will be made to the ensuing description and to the attached figures among which:

Figure 1:
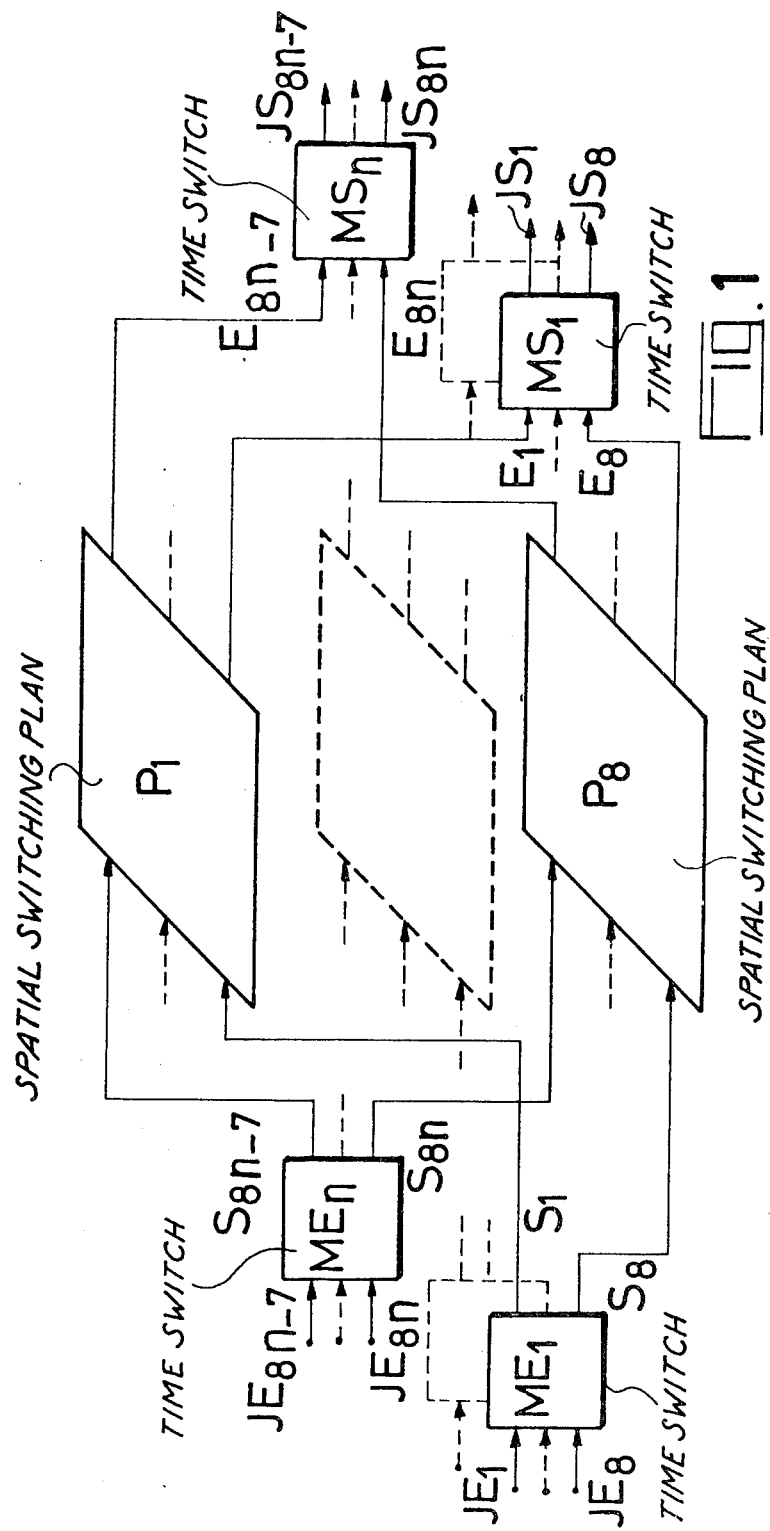
FIG. 1 illustrates a network of the TST type.

The connection network shown in FIG. 1 is of the TST type. In the interests of clarity, the illustration in FIG. 1 and also in the other Figs. is partial. In the time input stage, it comprises n time switches $ME_1$ to $ME_n$ each receiving 8 of the 8 n incoming PCM junctions $JE_1$ to $JE_{8n}$.

These time switches are provided with a speech memory in which the speech samples of the junctions are recorded in "parallel" mode after a series-parallel conversion in the order of their arrival. They are then read out in parallel mode in another order determined by the control unit responsible for path location in the network.

After a parallel-series conversion, the speech samples are conveyed in series mode through the spatial stages of the network.

A time switching circuit performing these functions is described in U.S. patent application Ser. No. 768,632.

The samples issuing from the planes $P_1$ to $P_8$ on the connections $E_1$ to $E_{8n}$ are then time switched in the output time switches $MS_1$ to $MS_n$ in a manner entirely symmetrical with that effected in the input time stage.

All these switching operations are organised by the central control unit which determines the desired paths in accordance with conventional procedures. Since this location of the paths is effected in the same way for all the connection networks to be discussed and since the subject of the invention is the structure of the network itself, it will not be discussed any further here.

Figure 2:
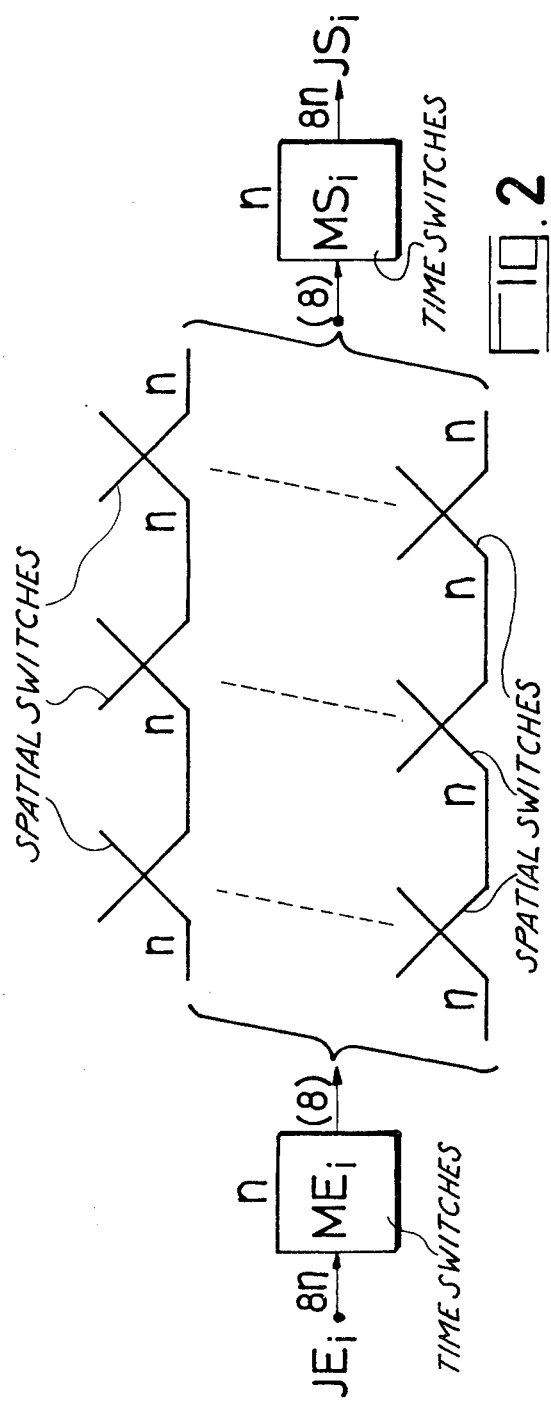
FIG. 2 illustrates in a symbolic representation the network illustrated in FIG. 1.

The representation of FIG. 1 is complex and it is easier to describe the invention with reference to a symbolic representation which is explained in FIG. 2 which shows the network of FIG. 1 according to this symbolisation.

FIG. 2 shows the 8 groups of n incoming junctions $JE_i$ represented by a single arrow terminating at the n input time switches $ME_i$ represented by a single square. The 8 n output connections of this input stage are represented by a single arrow bearing the reference 8 in brackets which indicates that these output connections are distributed over the 8 planes of the spatial switching stage. Only the first and eighth of these planes have been shown in the form of two networks of matrices each comprising three stages. The figures situated above the connections leading to these matrices represent the number of inputs and outputs of the matrices which, in the case illustrated, corresponds to a series of 8 planes.

The output time switching stage consisting of n output time switches $MS_i$ is of course symmetrical with the input stage.

The 256 switching times available for routing the samples in the spatial network are distributed over the 8 planes of this network at the rate of 32 times per plane.

Thus, the choice of one time from 256 is reflected in the choice of one plan and of one time from 32 in that plane.

The characteristics of the network described are as follows:

blocking $5.7^{10-2}$;

256 calls at most disturbed by a single fault in a time switch;

1/8 of the calls on average disturbed by a single fault in the time switch.

Figure 3:
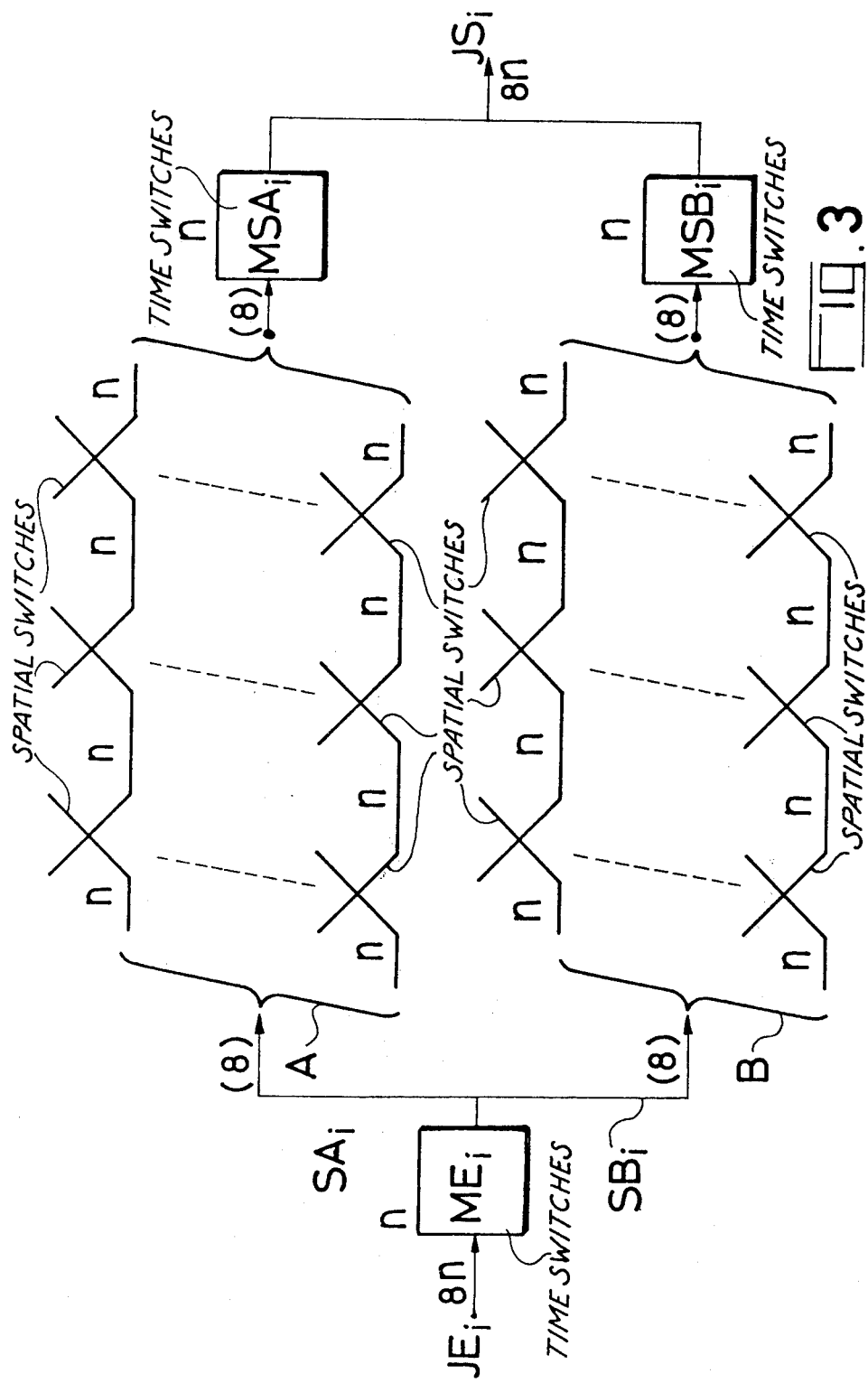
FIG. 3 illustrates in the symbolic representation of FIG. 2 a network according to the invention.

FIG. 3 shows, in the symbolisation defined above, the structure of a network according to the invention which considerably minimises these possibilities of disturbance.

To this end, the architecture of the spatial stage has been modified by division into two parallel branches A and B. Each of these two branches is composed of 8 parallel, independent planes each comprising three stages in the example illustrated. These three stages are represented in the drawing by the three square matrices of order $n \times n$.

The addition of 8 planes in the spatial network enables one or more faults to be accepted without the traffic capacity being affected, the traffic of a faulty plan being reported in an emergency plan.

The integration of the additional planes into the normal operation of the spatial switch increases the number of internal meshes thereof.

Since this number of planes is equal to twice that necessary for the connection of the time switches, the spatial switch is free from blocking (2n internal meshes for n access meshes).

A first advantage of having divided this spatial stage into two branches arises out of the fact that, when one of the 16 switching planes fails, the blocking thus introduced into the network is much lower than in the case where it is one plane out of 8 which fails. This comparison is justified because experience has shown that a failure such as this generally emanates from the failure of one element of a plan (for example a matrix) and does not react on the other planes. Under these conditions, there is no advantage in providing an emergency plane intended to counteract such a failure. Besides, this emergency plane was generally obtained by under equipping the time switches $ME_i$ and $MS_i$ with 7 PCM junctions, and the invention thus enables the inputs offered by the hardware to be fully utilised.

If the additional planes are only used for the traffic rejected by the first 8 planes which may be termed overflow traffic, the number of calls disturbed by a fault becomes negligible because it corresponds in every case to the traffic associated with an overflow plane either because the fault effectively affects an overflow plane or, if the fault affects a principle plane, because the traffic of that plan is taken over by an overflow plane to the detriment of its own traffic.

A second advantage of this structure of the spatial stage is that it is possible for the branches A and B to be used separately to provide twice as many time paths as there are input times, which virtually eliminates blocking.

To this end, only the number of output time switches is doubled and the planes of the branches A and B are arranged in parallel mode in twos at the input end.

The 8 planes of the branch A of the spatial stage are thus formed with n output time switches $MSA_i$ and the 8 planes of the branch B with n output time switches $MSB_i$. These switches are conventional and similar to the switches $MS_i$ in FIG. 2.

Thus, spatial switching on the one hand or time switching on the other hand are effected without blocking because, in the two cases, the number of internal meshes is equal to twice the number of access meshes.

In fact, the choice of one plane from 16 cannot be made both on the criterion of availability of the time network and on the criterion of the existence of routes in the spatial network.

The non-independence of these two choices brings the overall blocking level of the network equipped with 16 planes to a value below $10^{-20}$.

The network thus described thus comprises a blocking level which is substantially zero in normal operation and which is very low in defective operation despite a zero redundancy in the spatial network and without increasing the speed of operation. It is nevertheless very modular and may be adapted to all kinds of specifications in terms of size of network and volume of traffic.

In particular, it is perfectly possible to eliminate a more or less large number of the planes of the branch B for adapting the network to the blocking specifications emanating either from the expected traffic or from administrative requirements.

The blocking level is thus a function of the total number of planes. This function assumes the following particular values:

| Number of planes | Blocking |
|---|---|
| 16 | $10^{-20}$ |
| 14 | $10^{-14}$ |
| 12 | $10^{-10}$ |
| 10 | $10^{-6}$ |

The advantages of the network according to the invention are in particular:
quality of traffic;
safety of operation;
these two parameters being adjustable as required without modification of the structure of the network by the juxtaposition of a variable number of identical subassemblies;
economy of means;
by comparison with known solutions in which doubling of the number of internal time meshes at a constant speed is obtained by under-equipping half the input and output time switches with, in consequence, a quadratic increase in the spatial network for an equal number of switched junctions.

What we claim is:

1. A time division and spatial connection network for switching signals digitalized with 8 bits from an integer number $8 \times n$ of input junctions to $8 \times n$ output junctions, said network comprising:
   an input time switching stage connected to said input junctions, delivering said digitalized signals in series mode onto 8 pluralities of n first outputs, and having a given switching capacity;
   a first spatial switching branch divided into 8 identical first switching planes; said 8 first switching planes being respectively connected to said 8 pluralities of first outputs and each of said first switching planes having a blocking capacity equal to that of an $n \times n$ square matrix;
   a second spatial switching branch divided into k second switching planes, k being an integer comprised between 1 and 8; said k second switching planes being identical to said first switching planes and being respectively connected to k of said 8 pluralities of first outputs in parallel with k of said first switching planes;
   a first output time switching stage connected to said first spatial switching branch, having said given switching capacity, and connected to said output junctions for delivering onto said output junctions said digitalized signals; and
   a second output time switching stage connected to said second spatial switching branch, having said given switching capacity, and connected in parallel to said output junctions for delivering only said output junctions said digitalized signals.

2. A network as claimed in claim 1, wherein $k = n$.

* * * * *